Figure 1:
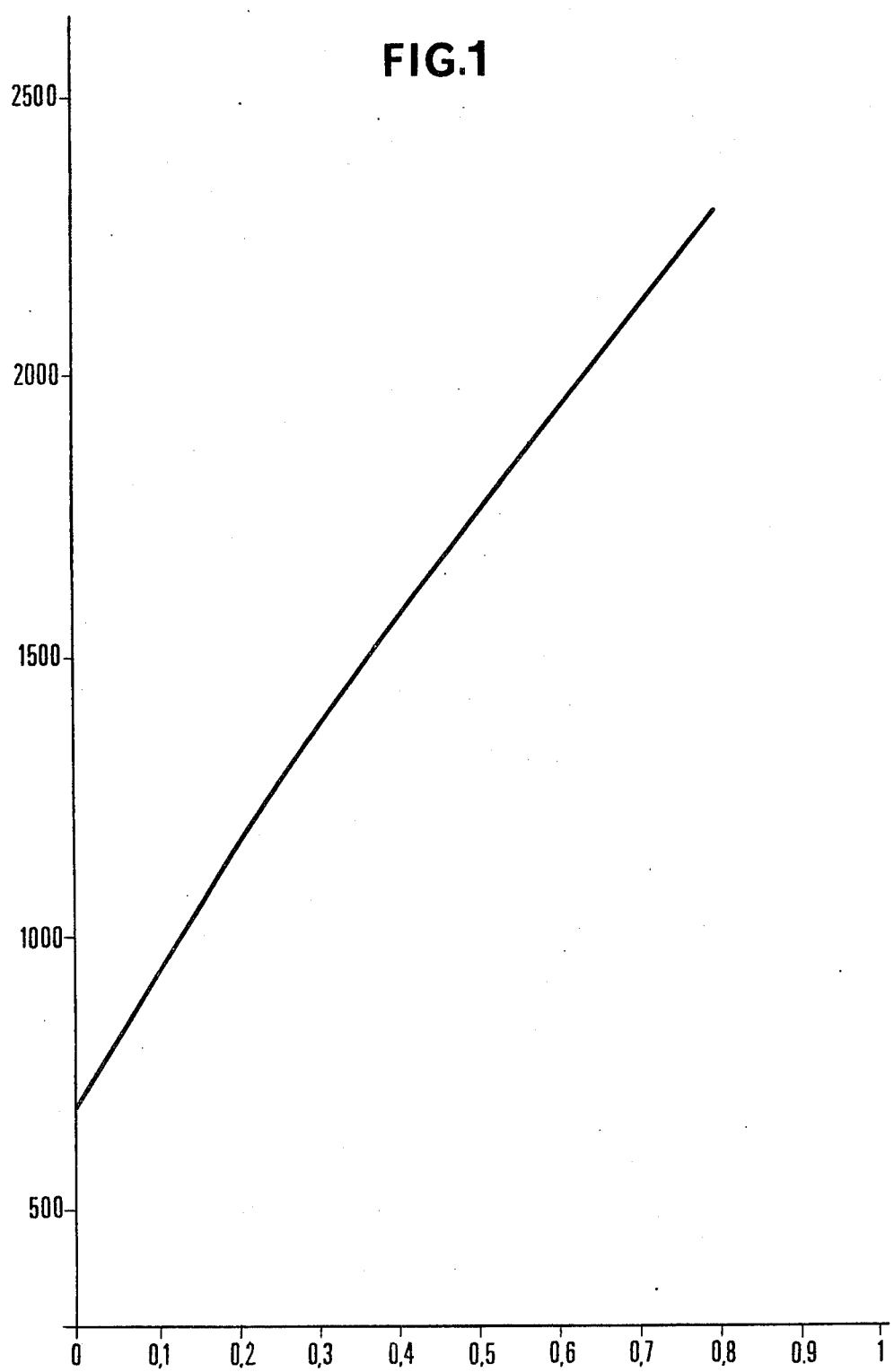

United States Patent [19]
Giet

[11] 4,013,759
[45] Mar. 22, 1977

[54] ACETYLENE-LIKE BLACK AND PROCESS
[75] Inventor: Claude Giet, La Barthe de Neste, France
[73] Assignee: Societe Anonyme: Produits Chimiques Ugine Kuhlmann, Paris, France
[22] Filed: May 15, 1974
[21] Appl. No.: 470,279
[30] Foreign Application Priority Data
May 15, 1973 France ............................ 73.17581
[52] U.S. Cl. .................. 423/445; 23/259.5; 106/307; 423/450; 423/458
[51] Int. Cl.² ......................................... C09C 1/48
[58] Field of Search .......... 423/450, 451, 455, 456, 423/457, 458, 460, 445; 23/259.5; 106/307
[56] References Cited
UNITED STATES PATENTS

| 1,738,716 | 12/1929 | Matlock | 423/458 |
| 1,758,152 | 5/1930 | Goodwin | 423/458 |
| 1,902,797 | 3/1933 | Burke | 423/458 |
| 2,121,463 | 6/1938 | Wisdom | 423/458 |
| 2,623,811 | 12/1952 | Williams | 423/458 |
| 2,690,960 | 10/1954 | Kistiakowsky et al. | 423/451 |
| 3,371,997 | 3/1968 | Jordan et al. | 423/450 |
| 3,397,961 | 8/1968 | Jordan et al. | 423/458 |

OTHER PUBLICATIONS

Mantell, "Industrial Carbon", 2nd Edition, 1946, pp. 81–88.

Primary Examiner—Edward J. Meros
Attorney, Agent, or Firm—Hammond & Littell

[57] ABSTRACT

The process comprises the incomplete combustion of at least one hydrocarbon having at least one ethylenical bond, preheated to a temperature clearly higher than its critical temperature, the black-formation temperature being at least 1700° C and the recovering of the so formed black, which may be used in the manufacture of dry cells.

7 Claims, 3 Drawing Figures

ACETYLENE-LIKE BLACK AND PROCESS

This invention relates to a new process for the preparation of an acetylene-like black having excellent characteristics from a mixture of hydrocarbon and oxygen. It also relates to the acetylene-like black obtained by such a process.

Conductive carbon blacks, and particularly acetylene blacks, having high electrical conductibility and good adsorbing properties, are used in the manufacture of dry cells and for certain applications, notably in the manufacture of electroconductive rubbers and conductive concretes.

It is known that the electrical conductibility of a conductive black is connected with its crystalline characteristics, which notably depend on the temperature of the black formation. The closer the black crystalline structure is near the crystalline structure of graphite, the higher is the conductibility of the black. The half-distance between the carbon atoms of the conductive blacks is comprised in the range of 3.48 to 3.52 A.

The available conductive carbon blacks are manufactured by the thermal decomposition of acetylene, from mixtures of hydrocarbons and acetylene, or by the thermal decomposition of a hydrocarbon or mixture of hydrocarbons.

According to the process described in French Patent No. 941,596, an acetylene black is prepared by the decompositions of an endothermic gas and preferably from acetylene. The already known acetylene blacks, which are obtained up to now principally by the thermal decomposition of acetylene, are different from the other conductive blacks by their extremely high carbon content; said content is higher than 99%, whereas the other carbon blacks have a carbon content lower than 98%. The black according to this invention is called acetylene-like black because, as it will be shown hereinafter, it has a carbon content approximately the same as the one of acetylene black.

According to the process described in French Pat. No. 1,426,071, a conductive black is obtained from a mixture of hydrocarbons and acetylene. According to said process, a mass of carbon black is first formed by the incomplete combustion and thermal decomposition of the starting hydrocarbons in the principal conversion zone of the furnace, and "additional amounts of acetylene" are then introduced into the hot carbon black aerosol. The aerosol temperature should be sufficient to induce acetylene decomposition. It is obvious that the formed intermediate product is not a carbon black having the required electrical conductibility and that the acetylene is added in order to improve said conductibility.

An other process consists in the thermal decomposition of a gaseous mixture of acetylene and one or more benzene carbides. The proportions of the mixture are such that it has an exothermic decomposition character (see French Patent No. 1,021,995).

All the now known processes for the preparation of conductive blacks consist generally in a thermal decomposition of either acetylene or a mixture of hydrocarbons and acetylene. Said conductive blacks are fairly costly owing to the fact that acetylene is used as starting material. The use of said processes further involves the dangers inherent in the manipulation of acetylene.

According to the process described in French Patent No. 1,333,100, a carbon black is manufactured by the thermal decomposition of a hydrocarbon or a mixture of gaseous or volatilized hydrocarbons. Said process in fact comprises two principal steps, i.e.:

1. the combustion, in the presence of an excess of preheated air, of a combustible, which has been preheated, in order to obtain the amount of heat necessary for the decomposition of the hydrocarbon fraction used for the formation of black.

2. the so-called decomposition, which results in the formation of carbon black. The combustion occurs at a pressure of a few atmospheres and at a temperature of about 1800° C; the thermal energy, thus produced, is used to degrade a hydrocarbon or a preheated hydrocarbon + $CO_2$ mixture, said hydrocarbon being injected into the gases obtained from the combustion; the said decomposition phase should take place according to said process at a temperature in the range of 1000° to 1,500° C, the formation of the black therefore occurs at said temperature according to said process. Among the hydrocarbons which are suitable according to said process, methane should notably be mentioned.

It has now been found possible to obtain a carbon black having high electrical conductibility in using an incomplete combustion of a preheated hydrocarbon, the dissociation of which is exothermic, if the formation temperature of the black is at least 1700° C. Below said temperature, the obtained black has no more advantageous electrical conductibility.

To effect a homogeneous combustion of the hydrocarbon, it is necessary to operate in the gaseous phase, and therefore to preheat the hydrocarbon to a temperature higher, preferably clearly higher, than its critical temperature. Furthermore, the adsorbing properties of the so formed black are improved if the hydrocarbon is preheated to a temperature as near as possible to its maximum temperature of the thermal stability. The used oxygen can be preheated or not.

This invention therefore relates to a process for obtaining an acetylene-like black which consists in effecting an incomplete combustion of at least one hydrocarbon, preheated to a temperature which is clearly above its critical temperature and, preferably, to a temperature as near as possible to its maximum temperature of the thermal stability, in the presence of oxygen, which may be preheated or not, the formation temperature of the black should be at least 1700° C and particularly higher than, or equal to 1900° C.

Said formation temperature may be compared with the theoretical temperature T, which is obtained by the thermodynamic equilibrium realized by the partial oxidation of a hydrocarbon having the general formula $C_nH_{2m}$ according to the reaction (1)

$$C_nH_{2m} + x\ O_2 \rightarrow (n-2x)C + 2x\ CO + m\ H_2 \quad (1)$$

the thermal balance of said reaction is given by the equation (2)

$$\Delta H\ [C_nH_{2m}] - 2 x\ \Delta H\ [CO] + QR\ [C_nH_{2m}] + x\ QR\ [O_2] = \sum_{298}^{T} PRC_{pp} R^{dT} \quad (2)$$

wherein $\Delta H[C_nH_{2m}]$ = internal energy of hydrocarbon formation at 25° C expressed in kCal/mole $\Delta H[CO]$ = Internal energy of carbon monoxide formation at 25° C expressed in kCal/mole $QR[C_nH_{2m}]$ = Preheating energy of the hydrocarbon expressed in kCal/mole $QR[O_2]$ = preheating energy of the oxygen expressed in kCal/mole $\Sigma PR\ C_{pp}R$ = Total heat carried off by the reaction products from 298° K (25° C) to T°K, expressed in kCal.

$x$ = Oxygen ratio.

Said equation allows to determine, a priori, whether a given hydrocarbon can provide the formation of an acetylene-like black according to the process of this invention. Thus, in practice, the incomplete combustion of a given hydrocarbon, preheated to a certain temperature, will lead to the formation of acetylene-like black, if the temperature of 1900° C (T = 2,173°K) is a solution of the preceeding equation for a suitable value of $x$ ($x$ should be comprised between 0 and n/2). If the hydrocarbon is, for example, methane, the equation of the partial combustion is:

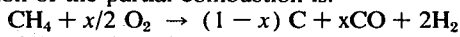
$$CH_4 + x/2\ O_2 \rightarrow (1-x)\ C + xCO + 2H_2$$

If the methane is preheated to 600+ C, equation (2) is written:

$$T^2(2.12 - 0.71\ x)10^{-3} + T(15.913 + 3.927x) - 10^3 (25.19x - 5.76) = O,$$

wherein T is the temperature in °K and x is the oxygen ratio.

This equation has no solution giving T 2,173°K (1900° C) for 0 < x < 1; therefore, a priori, the methane cannot lead to the formation of acetylene-like black according to this invention. It will be noted that the methane is a compound, the dissociation of which is endothermic. In the case of benzene, the combustion equation is:

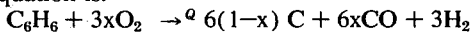
$$C_6H_6 + 3xO_2 \rightarrow 6(1-x)\ C + 6xCO + 3H_2$$

If the benzene is preheated to 450° C, the thermal balance (2) is written:

$$(18.15 - 8.52x)10^{-3}\ T^2/2 + (35.90 + 23.54\ x)T - (41.57 + 164.93x)10^3 = O$$

wherein x and T have the same meaning as above.

The graphical solution of this equation shown in FIG. 1, wherein the temperatures in ° C are shown as ordinates and the oxygen ratio $x$ as abscissa, shows that, for $x > 0.58$, a temperature higher than 1900° C is obtained. It is therefore possible to manufacture an acetylene-like black from benzene according to this invention. In the case of ethylene the equation is as follows:

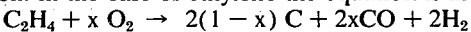
$$C_2H_4 + x\ O_2 \rightarrow 2(1-x)\ C + 2xCO + 2H_2$$

the thermal balance is written as follows: $(3.43 - 1.42x)10^{-3}\ T^2 + (18.59 + 7.85x)T - (18.25 + 54.98x)10^3 = O$ A temperature higher than 1900° C is obtained for $x = 0.86$.

By this calculation it is therefore possible to determine, firstly, whether a given hydrocarbon is suitable for the purpose of this invention, and secondly, the oxygen ratio to be used in order to obtain a temperature of black formation of at least 1700° C and more particularly 1900° C.

The determination of the temperature of black formation depends, to a certain extent, on the device used for carrying out the process. For each of the hydrocarbon-oxygen mixtures, the thermodynamic equilibrium provides a theoretical temperature, which is a solution of the aforesaid general equation. In most cases, said theoretical temperature should be at least equal to 1900° C, but the temperature of black formation actually obtained in the device, is in fact lower. Thus, a device providing an improved concentration of the thermal flux and a decrease of the losses allows, for an identical hydrocarbon-oxygen mixture, to obtain actually higher temperatures and therefore to obtain an acetylene-like black according to the invention for a hydrocarbon-oxygen mixture providing a theoretical temperature, given by the general equation, which is lower than 1900° C. According to this invention, such a theoretical temperature should be at least of 1700° C.

Generally speaking, the hydrocarbons, which may be used in the process of this invention, are the hydrocarbons having at least one ethylenical bond, such as ethylene, the aromatic hydrocarbons, for example benzene, toluene, xylene the unsaturated cyclic or polycyclic hydrocarbons and mixtures thereof.

The saturated aliphatic hydrocarbons are not suitable in as much as they are compounds, the dissociation of which is endothermic. Benzene or ethylene are preferably used in the process of this invention.

The petroleum cuts having a high amount of unsaturated polycyclic hydrocarbons are preferably used as polycyclic hydrocarbons in the process of this invention. These petroleum cuts, which are suitable in the present process, assay about 88 to 94% of carbon, about 10 to 4% of hydrogen, the balance to 100% being constituted by oxygen and/or sulphur. They have boiling curves (AFNOR standard) comprised between about 250° to 400° C. These petroleum cuts are preferably used in this invention in steam phase.

Figure 2:
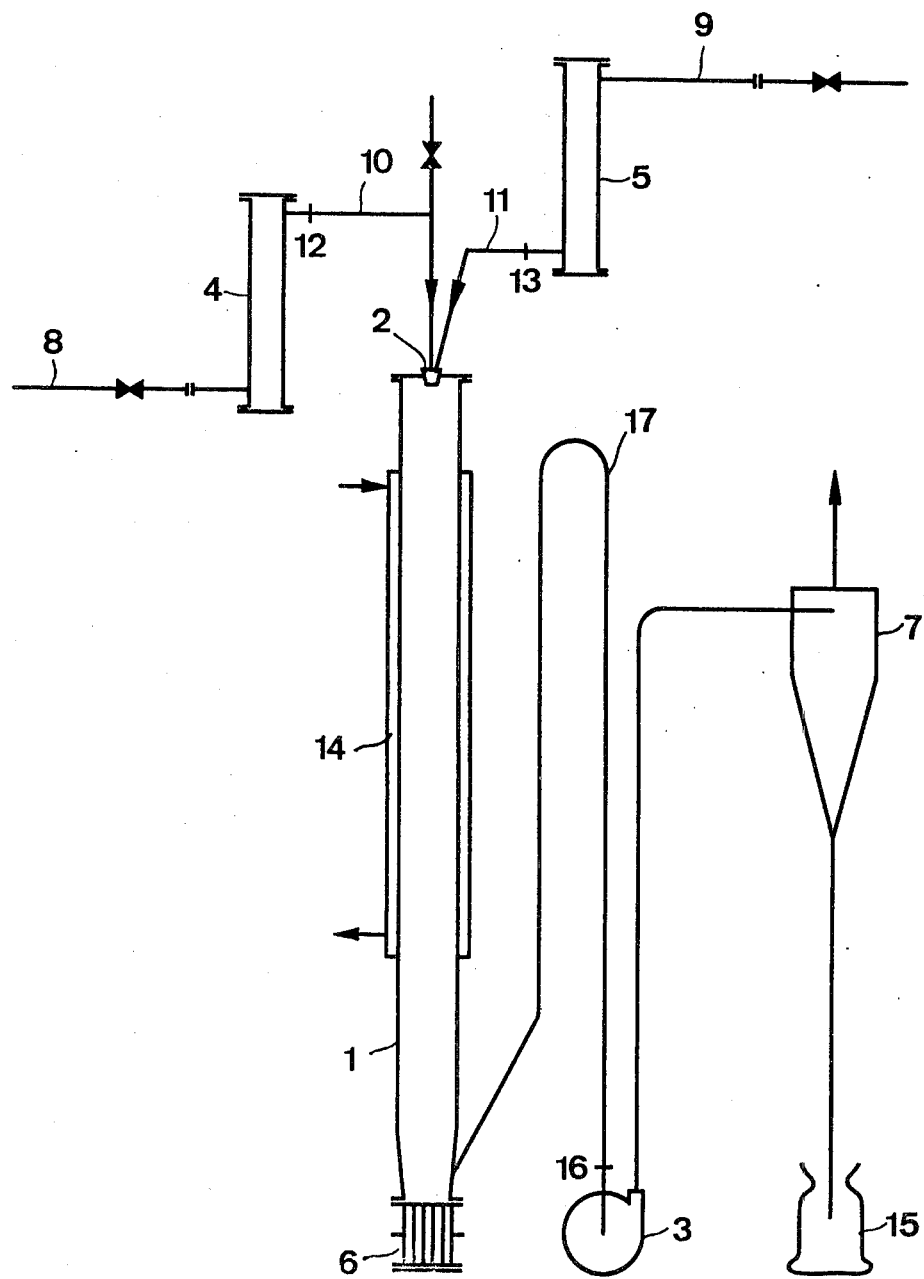

The device for carrying out the process of this invention comprises a vertical furnace, means for introducing at least one hydrocarbon into the upper portion of the furnace, means for introducing oxygen into a zone immediately adjacent to the one of the hydrocarbon introduction, means for establishing a lowering of pressure within the furnace, the formed carbon black being recovered in the lower part of the furnace. The device of the invention is illustrated in the accompanying drawings, in which FIG. 2 is a schematic representation wherein: 1 is the vertical furnace, 2 the hydrocarbon and oxygen introducing means, 3 the means for creating a lowering of pressure.

Figure 3:
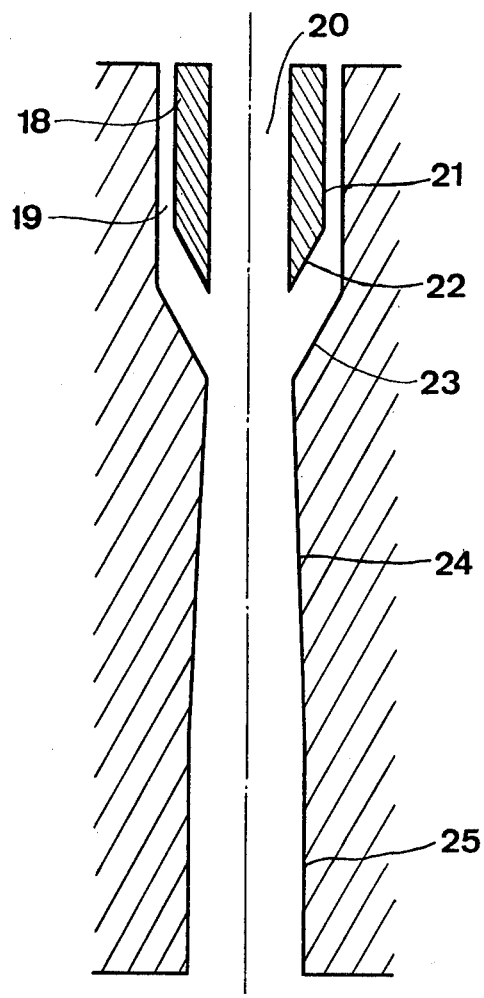

The hydrocarbon and oxygen introducing means consist of a burner, shown in axial cross-section in FIG. 3; said burner comprising an axial nozzle 18 in which the hydrocarbon is introduced, this axial nozzle is surrounded by an annular zone 19, used for introducing oxygen. The burner is extended within the furnace by an axial zone of a limited height and a diameter less than the one of the furnace, the volume of said zone being such that the time, which the reagents remain in the furnace, determined by preliminary trial, is shorter than the formation threshold of the black product.

The nozzle comprises a cylindrical inner channel 20 and an outer cylindrical surface 21 ending in a conical portion 22; the cylindrical annular zone 19 surrounding the said nozzle, which ends also in a conical portion 23, this latter being connected to the axial zone, which comprises two zones: a first conical zone 24 and a second cylindrical terminal zone 25.

The device further comprises hydrocarbon and oxygen heaters 4 and 5, a grinder 6 and separating cyclones 7.

The previously described device, which is shown in FIG. 2, is used to obtain the incomplete combustion of the hydrocarbon according to this invention. The hydrocarbon is introduced into the cylindrical channel 20 of the burner 2 through the line 10 after having been preheated in preheater 4 to a temperature as near as possible to its maximum temperature of thermal stability; said temperature being measured at 12. Oxygen is introduced through line 11 into the annular zone 19 of burner 2 after having optionally been preheated in the preheater 5; the oxygen-introduction temperature is measured at 13. Lines 8 and 9 are feed lines for preheaters 4 and 5 respectively. Incomplete combustion occurs in the vertical furnace 1, the walls of which are protected from the high temperature existing in the furnace by a double water-cooled jacket 14. The disintegrator grinder 6, rotating at high speed, breaks the agglomerates of black, which may form against the burner and are detached therefrom. The lowering of pressure within the furnace is created by ventilator 3; said lowering is necessary to prevent the burner from occlusion and to direct the formed aerosol into a set of cyclones 7, which separate the black from the cracking gases; the aerosol being cooled by natural convection along a circuit 17. The temperature is also measured at 16. After separation, the black is conveyed to a hopper 15.

The volume of the axial zone extending the burner, should be, as mentioned hereinabove, such that the gases remain in it for a period of time shorter than the black-formation threshold. Said time is determined by the preliminary test known as the "muffle test". In said test, the predetermined gas mixture is passed through a quartz tube raised successively to various temperatures, and the moment, when the first formation of black appears, is noted for each temperature. It was thus determined that a mixture containing, by weight, 42% of oxygen and 58% of benzene should remain at 500° C for a period less than 0.1 second.

The introduction rates of hydrocarbon and oxygen are determined with regard to the burner sizes and the remaining time in the reactor.

It is known that acetylene can be industrially produced by the incomplete combustion of hydrocarbons, followed by quenching, this latter being done to avoid carbon-black formation. The specific conditions for carrying out the process of this invention do not permit acetylene formation; however, the instantaneous formation of carbon black occurs.

The electrical conductibility and the adsorbing properties of the acetylene-like black obtained according to this invention are determined by the tests described below.

It is known that the conductibility of a body is an inverse ratio to its electrical resistivity. The specific resistivity is measured as follows:

A sample of black is placed in a non-conductive cylindrical tube comprising at its lower portion a metallic electrode-forming plug. A metallic piston, the end of which forms the other electrode, is set above the black. A weight sufficient to exert a pressure of 6.3 bars is applied to said piston. An amount of black reaching to a height of 1.5 cm under said conditions is introduced into the cylinder. The two electrodes are connected to a Wheatstone bridge. The specific resistivity $\rho$, expressed in ohm/cm, is calculated by the formula:

$$\rho = R.S/l$$

wherein:

$R$ is the resistance of the column of black measured in ohms $S$ is the cross-section of the column in cm$^2$ $l$ is the length of the column in cm.

The acetylene-like black of the invention has an electrical resistivity in the range of 0.4 to 0.7 ohm/cm. In the case of acetylene black the characteristics relative to the adsorbing properties are usually determined by the test consisting in:

- weighing 5 g of black, previously screened through a screen having a mesh size of 0.074 mm
- wetting said black with 3% acetonic water
- filtering the slurry through a buchner funnel under a partial vacuum of 200 mm water, then drying the cake formed for 20 minutes under the same conditions
- measuring the weight of the 3% acetonic water adsorbed by the 5 g of black.

The weight of adsorbed water, called the "filter index" characterizes the adsorbing properties of an acetylene black.

The filter index of the acetylene-like black, obtained by the process of this invention, is at least of 80: acetylene blacks, which are available have a filter index of about 60. The acetylene-like black of this invention therefore has adsorbing properties considerably higher than those of the already known acetylene blacks.

The adsorbing properties of blacks can also be determined by measuring their surface area. The surface area of available acetlyene blacks is in the range of 55 to 70m$^2$/g; the one of the black obtained by the process of this invention is in the range of 85 to 115m$^2$/g. The carbon content of the acetylene-like black of the invention is about 99.8%, the hydrogen and oxygen content is very low, the H$_2$ content is, for example, approximately 0.05 %.

As the black is produced very quickly, C-CO bonds, which would lower the electrical conductivity of the black, cannot be produced. The black of the invention has a linear crystalline form.

According to the process of the invention it is further possible to obtain an acetylene-like black finer than the available blacks; the particle sizes of the product of the invention are in the range of 150 to 200 A, whereas those of the available conductive blacks are comprised between 250 and 300 A, measured by nitrogen adsorption.

The following examples illustrate the invention, however, without being limited thereto.

EXAMPLE 1

In this example, the incomplete combustion of the preheated benzene is obtained according to the invention by using the device, schematically shown in FIG. 2, the furnace being provided with a burner shown in FIG. 3. The benzene preheated to 470° C in the heater 4 is introduced into the cylindrical inner channel 20 of burner 2 at a rate of 100 kg/hour. Non-preheated oxygen is then flowed progressively into the annular zone 19 of the burner at a rate of 50 Nm$^3$/h. The feed of the preheating burner is then cut off.

The temperature, measured at 16, becomes stable at 350° C. The low pressure, created in furnace 1 by ventilator 3 is 200 mm water. After two hours working, 77 kg of black were recovered for a consumption of 200 kg benzene, i.e. 2.6 kg of benzene per kg of produced black.

The specific resistance and filter index of said black are given in table I. For reasons of comparison, this table also shows the results of analyses effected on commercial acetylene blacks.

EXAMPLE 2

On this example, 100 kg of benzene preheated to 470° C and 47 Nm³/h of oxygen preheated to 320° C, are introduced in the same device as used in example 1. The temperature measured at 16 becomes stable at 320° C.

90 kg of black is obtained for 215 kg of benzene consumption, i.e. 2.4 kg of benzene per kg of black.

EXAMPLE 3

The same device is used as in the preceeding examples. 70 kg/h of ethylene preheated to 400° C and 41 Nm³/h oxygen preheated to 320° C are introduced. The temperature in measured at 16 stabilizes at 400° C.

25 kg of black is obtained for 110 kg of ethylene, corresponding to a consumption of 4.4 kg of ethylene to obtain 1 kg black.

The filter index and specific resistivity are shown in table I.

TABLE I

| Origin of the black | Specific resistivity ohm/cm | Filter index |
|---|---|---|
| Example 1 | 0.460 | 85 |
| Example 2 | 0.550 | 82 |
| Example 3 | 0.625 | 83 |
| "Y acetylene black" sold by Societe Produits Chimiques Ugine Kuhlmann | 0.670 | 61 |
| Standard acetylene black sold by Societe Shaulinigan (Canada) | 0.595 | 63 |

The results given in table I show that the black obtained by the process of the invention has a specific resistivity approximately equal to that of the available acetylene blacks, but has a filter index higher by at least 15 units.

I claim:

1. A carbon black having an electrical resistivity, measured under a pressure of 6.3 bars, in the range of 0.4 to 0.7 ohm/cm and a carbon content higher than 99%, having an adsorption capacity for water of filter index of at least about 80 gm of 3% acetonic water for 5 gm of carbon black, a particle size, measured by nitrogen adsorption, of less than about 200 A and a surface area in the range of 85 to 115 m²/gm.

2. A process for producing a carbon black having an electrical resistivity, measured under a pressure of 6.3 bars, in the range of 0.4 to 0.7 ohm/cm and a carbon content higher than 99%, having an adsorption capacity for water or filter index of at least 80 gm of 3% acetonic water for 5 gm of carbon black, a particle size, measured by nitrogen adsorption, of less than about 200 A and a surface area in the range of 85 to 115 m²/gm, which consists essentially of the steps of incompletely burning, in gaseous phase, at least one hydrocarbon selected from the group consisting of ethylenically unsaturated aliphatic hydrocarbons, aromatic hydrocarbons and monocyclic and polycyclic unsaturated hydrocarbons and mixtures thereof, by contacting said at least one hydrocarbon, preheated to a temperature clearly higher than its critical temperature, with oxygen and separating and recovering the so formed carbon black, wherein the temperature reached in said incomplete burning step is at least 1700° C.

3. The process according to claim 2, wherein the hydrocarbon used is ethylene.

4. The process according to claim 2, wherein the oxygen is preheated.

5. A process according to claim 2, wherein the hydrocarbon used is an aromatic monocyclic hydrocarbon selected from the group consisting of benzene, toluene and xylene and mixtures thereof.

6. A process according to claim 2, wherein the hydrocarbon used is a petroleum cut having a high amount of unsaturated polycyclic hydrocarbons, assaying about 88 to 94% of carbon, 10 to 4% of hydrogen, the balance to 100% being constituted by oxygen and/or sulphur, said cut having a boiling curve comprised between about 250° C to 400° C.

7. A process according to claim 2, wherein the temperature reached in said incomplete burning step is at least 1900° C.

* * * * *